3,806,479
ESTER-CONTAINING LIQUID POLYOLS
William J. Yapp, Park Forest, Cyriac C. Poovathunkal, Chicago, and Arthur L. Cunningham, Park Forest, Ill., assignors to The Sherwin-Williams Company, Cleveland, Ohio
No Drawing. Filed June 14, 1972, Ser. No. 262,831
Int. Cl. C08g 17/16; C09d 3/64
U.S. Cl. 260—22 EP  12 Claims

ABSTRACT OF THE DISCLOSURE

This invention is directed to ester-containing liquid polyol compositions and to the method of preparing same which comprises contacting and reacting at least one polycarboxylic acid or acid-producing compound and a monocarboxylic fatty acid with at least one aliphatic or cycloaliphatic polyhydroxy compound, e.g. an alkyleneglycol to obtain an ester-containing polyol intermediate and subsequently contacting and reacting said polyol intermediate with at least one epoxidized fatty oil or epoxidized fatty acid ester. The ester-containing liquid polyols are useful in preparing films, coatings and particularly for preparing resin coatings or enamels of the aminoplast and urethane-type.

---

This invention relates to ester-containing liquid polyol compositions and more specifically to the method of preparing liquid polyol compositions which are useful in preparing films, coatings and particularly for preparing baked enamels of the aminoplast and urethane type. More specifically, the ester-containing liquid polyols are obtained by contacting and reacting at least one carboxylic acid or acid-producing compound, e.g. a dicarboxylic acid either alone or in combination with a monocarboxylic acid and an aliphatic or cycloaliphatic polyhydroxy compound, e.g. one or more aliphatic glycols to obtain a liquid polyol intermediate. The polyol intermediate is subsequently contacted and reacted with at least one epoxidized fatty oil, e.g. an epoxidized soya oil or an epoxidized fatty acid ester to obtain a liquid ester-containing polyol. The ester-containing polyols may be characterized as liquid polyesters having at least two unreacted hydroxyl groups and only a small amount, if any, of ether groups distributed randomly in the molecule. Moreover, because of the comparatively large number of unreacted hydroxyl groups, the polyols may be used for preparing films, coatings, enamels, inks, lacquers, varnishes and various plastics of different degrees of hardness, flexibility, impact strength, etc. Specifically, the liquid polyols may be used in preparing various aminoplast, e.g. melamines or urethane-type resins etc.

The polyols presently available including the hydroxy-containing polyesters, acrylics, etc. require a solvent to render them useful in preparing coatings, etc. It is an advantage, however, to utilize liquid polyols that do not require solvents and which can be cured at a faster rate and at a lower temperature with various other types of resins. Because of the hydroxyl concentration of the liquid polyols of this invention, there is present during the curing reaction sufficient hydroxyl groups to achieve the desired molecular weight and crosslinking necessary for a good coating. Moreover, coatings cured with amino and urethane-type resins exhibit good color stability and low viscosity without a solvent, e.g. as low as 10 poise by Gardner-Holdt.

Accordingly, it is an object of this invention to provide ester-containing liquid polyols useful in preparing clear or pigmented coatings and films. It is another object of this invention to provide ester-containing liquid polyols for preparing tough, resilient films, which are mar-resistant and have good adhesion to various substrates. It is a further object of this invention to provide ester-containing liquid polyols particularly useful in preparing aminoplast and urethane-type resins. It is still a further object of this invention to provide ester-containing liquid polyols which exhibits faster and lower temperature cures in preparing aminoplast and urethane-type resins. These and other objects will become apparent from a further and more detailed description of the invention.

Specifically, this invention relates to ester-containing polyol compositions obtained by contacting and reacting at a temperature of at least about 50° C. (a) from about 1.0 to 34% by weight and preferably from about 12 to 20% by weight of at least one polycarboxylic acid or acid-producing compound, e.g. phthalic anhydride and (b) from about 0 to 21% by weight and preferably from about 4 to 10% by weight of a monocarboxylic fatty acid with (c) from about 30 to 45% by weight and preferably from about 32 to 45% by weight of at least one aliphatic or cycloaliphatic polyhydroxy compound, e.g. an alkylene glycol to obtain an ester-containing polyol intermediate. The intermediate is subsequently reacted with (d) at least about 20 to 60% and preferably 30 to 50% by weight of at least one epoxidized fatty oil or epoxidized fatty acid ester, e.g. an epoxidized soya oil having an oxirane oxygen content ranging from about 1 to 12% and preferably from about 2 to 10% by weight.

In the initial reaction between the carboxylic acids or derivatives thereof and the polyhydroxy compound, e.g. a polyalkylene glycol, an intermediate is obtained which may be characterized as a liquid polyester having unreacted hydroxy groups. Upon subsequently reacting the intermediate with the epoxidized fatty acid oil or epoxidized fatty acid ester, said epoxy groups are preferentially esterified by the carboxylic groups, e.g. carboxylic acid groups of the intermediate as opposed to etherification. The liquid polyol may be characterized as being essentially a liquid polyester having unreacted hydroxyl groups with little, if any, ether groups because of the order and conditions, e.g. temperature, etc. under which the reaction is carried out. Thus, it is important for purposes of this invention, to initially react the carboxylic acids or derivatives thereof with a polyhydroxy compound to form the polyester and subsequently react said polyester with the epoxidized fatty oils.

Esterification of the polyhydroxy compounds and the carboxylic acids or derivatives thereof may take place at temperatures as low as 50° C. and preferably at temperatures as low as 100° C. and as high as about 300° C., e.g. temperatures ranging from about 150° to 250° C. The subsequent reaction of the hydroxy-containing polyester and the epoxidized fatty acid oils similarly may take place at temperatures as low as 50° C., but preferentially at temperatures above 100° C. and as high as 300° C. When esterifying, it is not necessary to utilize an esterification catalyst. However, the esterification catalysts are well known and accordingly may be utilized, if desired, in about 0.001 to 5.0 and preferably from about 0.1 to 1.0% by weight of the reactants.

The epoxy-containing esters or oils include the curable epoxidized esters of fatty acids having up to about 36 aliphatic carbon atoms and preferably from 6 to 22 aliphatic carbon atoms in the acid radical and up to about 16 and preferably from 4 to 12 carbon atoms in the mono- or polyhydric alcohol radical. The esters that may be used in preparing the oxirane-containing fatty acid esters include the natural occurring and synthetically prepared esters of the unsaturated monocarboxylic acids found in various drying oils or semi-drying oils, such as soybean oil, safflower oil, etc. Generally, the alcohol radical of these esters are derived from polyhydroxy alcohols having at least two hydroxy groups per molecule. However, the esters, e.g. unsaturated esters may be derived from simple polyhydroxy alcohols such as glycerol, pentaerythritol, etc. chemically combined with one or more of the above-mentioned fatty acids.

Other fatty acid esters may be prepared by reacting various alcohols, e.g. the mono- and polyhydroxy alcohols with one or more fatty acids to obtain esters. The alcohols that may be used to prepare the esters include, for example, the monohydric alkyl and alkenyl alcohols which provide the alcohol moiety such as methyl, ethyl, propyl, isopropyl, butyl, isobutyl, amyl, isoamyl, hexyl, heptyl, octyl, etc. The dihydric alcohols include, for example, glycols such as ethylene glycol, propane diol, 1,2-propane diol, dimethyl glycol, trimethylene glycol, pentamethylene glycol, hexamethylene glycol, etc. Other polyhydric alcohols that may be used include glycerol, erythritol, pentaerythritol, manitol, sorbitol, etc. The various alcohols either alone or in combination may be reacted with a fatty acid to obtain esters which are epoxidized by known techniques to obtain the epoxidized esters having the required oxirane oxygen content.

The natural occurring drying or semi-drying oils comprise the unsaturated fatty esters which have the characteristics of solidifying and hardening when exposed to air. Therefore, for purposes of this invention, one or more of these natural fatty-acid esters may be reacted with an epoxidizing agent, e.g. peracetic acid in amounts sufficient to obtain an epoxidized ester having from about 1 to 12% by weight of oxirane oxygen. In addition to peracetic acid, other known epoxidizing agents include the various aliphatic, aromatic, and inorganic peracids, salts of said acids, peroxides, hydroperoxides, etc. Preferably, however, the aliphatic peracids such as performic, peracetic, perpropionic, etc. are used as the epoxidizing agents. The epoxidation of fatty acid esters and fatty oils is known and the products for purposes of this invention are presently available as pointed out, for example, in U.S. Pat. 2,569,502.

Some specific examples of the various epoxy-containing fatty acid esters derived from aliphatic fatty acids, include methyl epoxystearate, ethyl epoxystearate, isopropyl epoxystearate, butyl epoxystearate, epoxidized 2-ethylhexyl tallate, epoxidized 1,5-pentane dioldioleate, epoxidized 1,2,6-hexane-trioldioleate monoacetate, epoxidized methyloleate, epoxidized glycerol trilinoleate, epoxidized glycerol monooleate, epoxidized glycerol monolinoleate, epoxidized glycerol monostearate dilinoleate, epoxidized esters of mono-, di-, or poly-pentaerythritol with soy, tall or linseed fatty acid and various mixtures of these esters in any proportion. Examples of the epoxidized fatty oils include epoxidized lard oil, epoxidized peanut oil, epoxidized olive oil, epoxidized safflower oil, epoxidized castor oil, epoxidized neats foot oil, epoxidized corn oil, epoxidized cotton seed oil, epoxidized soybean oil, epoxidized perilla oil, epoxidized menhaden oil, epoxidized linseed oil, etc.

Obviously, epoxidized esters of different types and oxirane values may be blended to obtain the desired characteristics, e.g. to improve the drying speeds, etc. These epoxidized oils are readily obtained by reacting, for example, the oil or triglyceride which contains at least one double bond with paracedic acid at comparatively low temperatures. During the reaction, the ethylenic groups or double bonds of the triglyceride are converted to epoxy groups without otherwise altering the molecular structure of the glyceride. As indicated, animal, vegetable and marine triglycerides are well known in the art as natural occurring ethylenic unsaturated materials. These materials can be epoxidized by known methods to provide epoxidized fatty esters having varying amounts of oxirane groups.

The polyhydroxy compounds to be reacted with the carboxylic acids or the derivatives thereof to obtain the ester-containing polyol intermediates may have up to 40 aliphatic or cycloaliphatic carbon atoms, e.g. $C_2$–$C_{22}$, and from 2 to 10 and preferably from 2 to 6 hydroxy groups per molecule. The polyhydroxy compounds are present in amounts ranging from about 30 to 45% by weight of the total reaction mixture and includes various polyhydric alcohols such as the alkylene glycols, e.g. ethylene glycol, propylene glycol, butylene glycol, diethylene glycol, triethylene glycol, tetraethylene glycol, dipropylene glycol, tripropylene glycol, tetrapropylene glycol, tributylene glycol, dibutylene glycol, 1,3-propylene glycol, 1,3-butylene glycol, 1,2-propane diol, 1,3-propane diol, 1,4-butane diol, dimethylethylene glycol, trimethylene glycol, tetramethylene glycol, pentamethylene glycol, pentaethylene glycol, hexamethylene glycol, 1,6-hexane diol and various polyglycols having from 2 to 10 aliphatic carbon atoms and at least two and preferably at least three hydroxy groups per molecule, e.g. glycerol, erythritol, pentaerythritol, the hexitols such as mannitol and sorbitol.

Included also are the cycloaliphatic diols such as cyclopentane diol, cyclohexane diols, cycloheptane diol, cyclooctane diol, etc. Other higher molecular weight polyhydroxy compounds may include, for example, the polypropylene glycols, polybutylene glycols, polyethylene glycols and other polyalkylene glycols or polyoxyalkylene glycols and the polyglycerols such as the diglycerols, glycerol trimethylolethane, glycerol trimethylolpropane, 1,2,6-hexane triol, tetrahydroxy butane, tetrahydroxy pentane, tetrahydroxy octane, tetrahydroxy heptane, the polypentaerythritols and various polymeric low molecular weight polyhydroxy compounds either alone or in combination.

The polycarboxylic acids or acid-producing compounds to be reacted with the polyhydroxy compounds may have at least two carboxylic acid or acid-producing groups and up to 40 carbon atoms. These polycarboxylic acids include the alkyl, aryl, alkaryl, aralkyl and cycloalkyl polycarboxylic acids or acid-producing compounds, i.e. derivatives of carboxylic acids. The derivatives of the acids may be selected from the class consisting of the anhydrides of the polycarboxylic acids, the low molecular weight esters, i.e. $C_1$–$C_8$ esters such as the methyl, ethyl or propyl esters, etc., the salts, e.g. the ammonia salt, the nitrogen derivatives such as the amides, imides, amidines and the various other derivatives of polycarboxylic acids that may be used as a chemical equivalent, to produce carboxylic groups for esterifying the polyhydroxy compounds.

Specific examples of the polycarboxylic acids, e.g. the dicarboxylic acids, the anhydrides and derivatives thereof include maleic acid, succinic acid, chlorendic anhydride, phthalic anhydride, tetrahydrophthalic anhydride, hexahydrophthalic anhydride, Nadic anhydride, oxalic acid, adipic acid, citraconics, terephthalic acid, isophthalic acid, sebacic acid, azelaic acid, mellitic acid, pyromellitic acid, fumaric acid, itaconic acid, the alkyl or alkenyl substituted succinic acids, the dimerized fatty acids, diglycollic acid and various tricarboxylic acids such as 1,2,3-propane tricarboxylic acid, citric acid, trimellitic acid, trimesic acid, etc. The polycarboxylic acids and especially the dicarboxylic acids are used either alone or in combination in amounts ranging from about 1 to 34% and preferably in amounts ranging from 1 to 16% by weight of the total amount of reactants.

In addition to the polycarboxylic acids or the derivatives thereof, it may be desirable to react from about 0 to 21% or 4 to 10% by weight of at least one monocarboxylic fatty acid or acid-producing compound, e.g. a halide or ester of the fatty acid which reacts with the hydroxyl groups of the polyhydroxy compound.

The monocarboxylic acids may include, for example, any of the natural or synthetically prepared fatty acids such as linseed oil fatty acids, linoleic acids, hempseed oil acid, cotton seed oil fatty acid, poppyseed fatty acid, rapeseed fatty acid, soybean fatty acid, tall oil fatty acid, tung oil fatty acid, fish oil fatty acid, safflower fatty acid, acetic acid, butyric acid, propionic acid, caproic acid, caprylic acid, lauric acid, myristic acid, pentadecanoic acid, palmitic acid, stearic acid, behenic acid, hyenic acid, acrylic acid, sorbic acid, linoleic acid, linolinic acid and various derivatives including the halides, salts and low molecular weight esters, e.g. methyl ester and other acid-producing compounds having up to 32 aliphatic carbon atoms per molecule. Thus, various derivatives or chemical equivalents of the monocarboxylic acids may be used to esterify the polyhydroxy compounds, e.g. glycols, etc.

The following illustrates the ester-containing liquid polyols and their use for purposes of this invention.

EXAMPLE 1

| Reactants: | Parts by weight |
|---|---|
| Phthalic anhydride | 296 |
| Adipic acid | 110 |
| Tall oil fatty acid | 141 |
| Diethylene glycol | 810 |
| Epoxidized soya oil | 788 |

The phthalic anhydride, adipic acid, tall oil fatty acid and diethylene glycol were mixed in a reaction vessel equipped with a stirrer, reflux condenser, temperature measuring device and an inert gas sparge tube. The reactants were heated to about 121° C. at which temperature virtually all of the phthalic anhydride and adipic acid were dissolved to form a clear solution. The epoxidized soya oil was added to the reactor and the temperature was increased to about 193° C. with an inert gas blanket. This temperature was maintained until an acid value of less than 20 was obtained over a period of about 2½ hours. The product had a final acid value of about 14, a color (Gardner) of 6, a viscosity of 3200 cps., and a hydroxyl number of about 400.

EXAMPLE 2

| Reactants: | Parts by weight |
|---|---|
| Phthalic anhydride | 296 |
| Adipic acid | 108 |
| Diethylene glycol | 720 |
| Epoxidized soya oil | 1050 |

A liquid polyol was prepared by the same procedure as Example 1. The product had a final acid value of 11, a color (Gardner) of 2, a viscosity of 8000 cps. and a hydroxyl number of 230.

EXAMPLE 3

| Reactants: | Parts by weight |
|---|---|
| Phthalic anhydride | 712 |
| Adipic acid | 365 |
| Diethylene glycol | 1620 |
| Epoxidized soya oil | 1070 |

A liquid polyol was prepared by the same procedure as Example 1. The final product had an acid value of 14, a viscosity of 3200 cps., a color of 5 and a hydroxyl number value of 160.

EXAMPLE 4

| Reactants: | Parts by weight |
|---|---|
| Phthalic anhydride | 506 |
| Adipic acid | 250 |
| Propylene glycol | 1172 |
| Epoxidized soya oil | 1347 |

A liquid polyol was obtained by the procedure of Example 1. The final product had a viscosity of 3200 cps., a color (Gardner) of 3, an acid value of 11 and a hydroxyl number value of 320.

EXAMPLE 5

| Reactants: | Parts by weight |
|---|---|
| Phthalic anhydride | 502 |
| Adipic acid | 213 |
| Propylene glycol | 1178 |
| Epoxidized soya oil | 1526 |

A liquid polyol was prepared by the procedure of Example 1. The final product had a viscosity of 8000 cps., an acid value of 18, a color (Gardner) of 3, a hydroxyl value number of 320.

The liquid ester-containing polyols were incorporated into coating compositions as illustrated below:

EXAMPLE A

| | Parts by weight |
|---|---|
| The liquid polyol of Example 1 | 69.5 |
| Hexakis-methoxymethyl melamine | 29.5 |
| Sodium sulfated dioctyl succinate | 1.0 |

The coating composition of Example A was used to coat phosphated steel panels to form films of approximately 3 mils in thickness and then was cured in a baking oven at a temperature of about 250° F. for about ½ hour.

In general, the viscosity of a polyol is determined by the polyols chain stiffness, molecular weight and solubility characteristics. Thus, if the indicated amount of a polyhydroxy compound, e.g. a glycol is used in preparing a particular polyol the resulting coating composition will be a liquid by virtue of the lower molecular weight and also will obviously have a higher concentration of hydroxy groups. In comparison to other polyols, the lower molecular weight liquid polyols of this invention have a higher hydroxyl concentration which provides the route to achieve coatings with the desired molecular weight, cross-linking, etc. It is the hydroxyl value of these polyols which leads to the increased cure rate a lower temperatures. In addition, the liquid characteristics of these ester-containing polyols make them particularly desirable for use in the formulation of high solid coating such as inks, paints, etc.

While this invention has been described by a number of specific embodiments, it is obvious that other modifications can be made without departing from the spirit and scope of the invention as particularly pointed out in the appended claims.

What is claimed is:

1. An ester-containing liquid polyol obtained by reacting, based on the total weight of the reactants, (a) from about 1.0 to 34% by weight of at least one polycarboxylic acid or polycarboxylic acid-producing compound and (b) from about 0 to 21% by weight of a monocarboxylic fatty acid with (c) about 30 to 45% by weight of at least one aliphatic or cycloaliphatic polyhydroxy compound having from 2 to 10 hydroxy groups per molecule to obtain an ester-containing polyol intermediate and subsequently reacting said intermediate with (d) from about 20 to 60% by weight of at least one epoxidized fatty oil or epoxidized fatty acid ester having an oxirane oxygen content ranging from about 1 to 12% by weight.

2. The polyol of claim 1 further characterized in that the epoxidized fatty oil is an epoxidized soybean oil, the aliphatic polyhydroxy compound is a polyalkylene glycol and the polycarboxylic acid-producing compound is phthalic anhydride.

3. The polyol of claim 2 further characterized in that the polycarboxylic acid is adipic acid.

4. The polyol of claim 1 further characterized in that the polycarboxylic acid is a dicarboxylic acid.

5. The polyol of claim 1 further characterized in that the polycarboxylic acid or polycarboxylic acid-producing compound is a dicarboxylic acid, the aliphatic polyhydroxy compound is an alkylene glycol having from 2 to 6 hydroxyl groups per molecule and the epoxidized fatty oil is an epoxidized soybean oil.

6. The polyol of claim 1 further characterized in that the polycarboxylic acid-producing compound is phthalic anhydride, the monocarboxylic fatty acid is tall oil fatty acid, the polyhydroxy compound is an alkylene glycol and the epoxidized fatty oil is an epoxidized soya oil.

7. The polyol of claim 6 further characterized in that the phthalic anhydride is present in an amount ranging from about 12 to 20% by weight, the tall oil fatty acid is present in an amount ranging from about 4 to 10% by weight, the alkylene glycol is present in an amount ranging from about 32 to 45% by weight and the preoxidized soya oil is present in an amount ranging from about 25 to 50% by weight.

8. The polyol of claim 7 further characterized in that the alkylene glycol is dipropylene glycol.

9. The polyol of claim 7 further characterized in that the alkylene glycol is diethylene glycol.

10. The polyol of claim 1 further characterized in that the polycarboxylic acid is a dicarboxylic acid, the aliphatic polyhydroxy compound is an aliphatic glycol having from 2 to 6 hydroxy groups per molecule, and the epoxidized fatty oil is an epoxidized vegetable oil having an oxirane oxygen content ranging from about 2 to 10% by weight.

11. A process for preparing an ester-containing liquid polyol which comprises contacting and reacting at a temperature of at least about 50° C., based on the total weight of the reactants, (a) from about 1 to 34% by weight of at least one polycarboxylic acid or polycarboxylic acid-producing compound and (b) from about 0 to 21% by weight of a monocarboxylic fatty acid with (c) about 30 to 45% by weight of at least one aliphatic or cycloaliphatic polyhydroxy compound having from 2 to 10 hydroxy groups per molecule to obtain an ester-containing polyol intermediate; subsequently reacting said intermediate at a temperature of at least about 100° C. with (d) from about 20 to 60% by weight of at least one epoxidized fatty oil or epoxidized fatty acid ester having an oxirane oxygen content ranging from about 1 to 12% by weight.

12. The process of claim 11 further characterized in that the intermediate is reacted at a temperature of at least about 150° C. with an epoxidized fatty oil.

References Cited

UNITED STATES PATENTS

| 3,066,159 | 11/1962 | De Groote et al. | 260—404 |
| 3,264,236 | 8/1966 | Santaniello | 260—22 TN |
| 3,397,255 | 8/1968 | Coats et al. | 260—850 |
| 3,502,601 | 3/1970 | Case et al. | 260—31.2 N |
| 3,520,841 | 7/1970 | Graver et al. | 260—33.6 UA |

FOREIGN PATENTS

| 165,946 | 11/1955 | Australia | 260—22 EP |
| 649,204 | 9/1962 | Canada | 260—22 EP |
| 858,827 | 1/1961 | Great Britain | 260—22 EP |
| 987,191 | 3/1965 | Great Britain | 260—22 EP |
| 1,072,801 | 1/1960 | Germany | 260—22 EP |

DONALD E. CZAJA, Primary Examiner

R. W. GRIFFIN, Assistant Examiner

U.S. Cl. X.R.

117—132 BE, 161 ZB